United States Patent [19]

Springer et al.

[11] Patent Number: 5,055,565
[45] Date of Patent: Oct. 8, 1991

[54] WATER-SOLUBLE DISAZO COMPOUNDS, CONTAINING A VINYLSULFONYL OR $\beta$-CHLOROETHYLSULFONYL GROUPING BONDED DIRECTLY OR VIA A METHYLENE GROUP OR A LOWER ALKYL AMINO GROUP TO A BENZOYLAMINO GROUP, SUITABLE AS DYESTUFFS

[75] Inventors: Hartmut Springer, Königstein; Manfred Kühn, Frankfurt am Main; Werner H. Russ, Hofheim am Taunus; Ludwig Schläfer, Kelkheim, all of Fed. Rep. of Germany

[73] Assignee: Hoechst Aktiengesellschaft, Frankfurt am Main, Fed. Rep. of Germany

[21] Appl. No.: 570,033

[22] Filed: Aug. 20, 1990

Related U.S. Application Data

[63] Continuation of Ser. No. 224,497, Jul. 26, 1988, abandoned.

[30] Foreign Application Priority Data

Jul. 28, 1987 [DE] Fed. Rep. of Germany ....... 3724931

[51] Int. Cl.$^5$ ................... C09B 62/513; D06P 1/384
[52] U.S. Cl. .................. 534/642; 534/582; 534/591; 534/641
[58] Field of Search ........... 534/640, 641, 642

[56] References Cited

U.S. PATENT DOCUMENTS

| 3,426,008 | 2/1969 | Meininger et al. | 534/641 |
|---|---|---|---|
| 3,440,240 | 4/1969 | Kuhne et al. | 534/641 |
| 3,950,128 | 4/1976 | Gregory | 534/637 |
| 4,473,498 | 9/1984 | Schlafer et al. | 534/641 |
| 4,719,053 | 1/1988 | Schlafer et al. | 534/641 |

FOREIGN PATENT DOCUMENTS

| 42108 | 12/1981 | European Pat. Off. | 534/637 |
|---|---|---|---|
| 202570 | 11/1986 | European Pat. Off. | 534/637 |
| 1403165 | 5/1965 | France | 534/641 |
| 1524753 | 5/1968 | France | 534/641 |
| 42-15010 | 8/1967 | Japan | 534/641 |
| 47-38034 | 9/1972 | Japan | 534/642 |

*Primary Examiner*—Mary C. Lee
*Assistant Examiner*—Fiona T. Powers

[57] ABSTRACT

Compounds according to the general formula

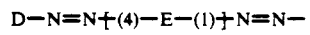

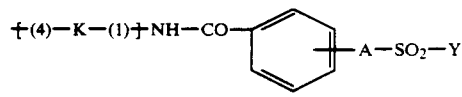

in which:
- D is phenyl, optionally substituted by sulfo, carboxy, alkyl, alkoxy, alkanoylamino and/or chlorine, at least by sulfo or carboxy, or is a sulfosubstituted naphthyl;
- E is 1,4-phenylene, substituted by alkyl, alkoxy, alkanoylamino, ureido and/or chlorine, or is 1,4-naphthylene optionally substituted by sulfo;
- K is 1,4-phenylene, substituted by alkyl, alkoxy, alkanoylamino, ureido and/or chlorine, or is a 1,4-naphthylene optionally substituted by sulfo;
- A is a direct bond or is methylene or is a bivalent amino, alkylamino or ($\beta$-cyanoethyl)-amino group;
- Y is vinyl or $\beta$-chloroethyl.

These compounds are fiber-reactive and have dyestuff properties and dye hydroxy—and/or carboxamido-containing material, in particular fiber material such as wool and, in particular cellulose, in strong color-fast shades.

16 Claims, No Drawings

WATER-SOLUBLE DISAZO COMPOUNDS, CONTAINING A VINYLSULFONYL OR β-CHLOROETHYLSULFONYL GROUPING BONDED DIRECTLY OR VIA A METHYLENE GROUP OR A LOWER ALKYL AMINO GROUP TO A BENZOYLAMINO GROUP, SUITABLE AS DYESTUFFS

This is a continuation application of copending application Ser. No. 07/224,497, filed on July 26, 1988, and now abandoned.

DESCRIPTION

The technical field of the invention is that of fiber-reactive disazo dyestuffs.

Fiber-reactive disazo compounds having a chlorotriazine grouping and which as brown dyestuffs are capable of dyeing cellulose fibers are known from the literature. In general, they do not meet the industrial requirements which nowadays are demanded of fiber-reactive dyestuffs because they have only insufficient properties for practical use such as, for example, a too low fiber-reactivity, which requires dyeing temperatures of more than 70° C., an insufficient affinity and a poor color buildup; in addition, the dyeings which can be achieved therewith have a too low resistance to acid fading, that is they show distinct acid fading. For example, from U.S. Pat. No. 3,950,128, brown disazo dyestuffs are known which have a low reactivity towards the fiber and can be used as a dyestuff only at temperatures above 70° C.; in addition, the dyeings which can be obtained therewith have only a low resistance to acid fading. The same is true of the brown disazo dyestuffs described in European Patent Application Publication No. 0,042,108 which additionally give in some cases only unlevel dyeings. Likewise, the fiber-reactive disazo dyestuff described in Example 7 of European Application Publication No. 0,202,570, in addition to the abovementioned disadvantages, also has insufficient affinity and a poor color buildup.

Therefore, there was still a demand in industry to prepare fiber-reactive brown dyestuffs which have sufficiently good properties for practical use and good fastness properties.

The present invention now provides novel disazo compounds which, unlike the abovementioned known disazo compounds, do not have a heterocyclic fiber-reactive radical and which surprisingly do not have the disadvantages mentioned in connection with the known brown disazo dyestuffs. The disazo compounds according to the invention correspond to the general formula (1)

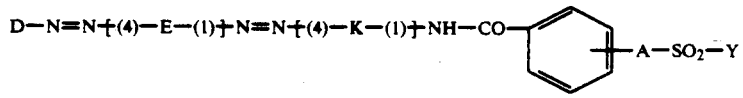

(1)

in which the symbols have the following meanings:

D is the phenyl radical which can be substituted by 1, 2 or 3 substituents, the substituents being selected from the following set of substituents: 2 sulfo groups, 2 carboxy groups, 2 alkyl groups having 1 to 4 carbon atoms such as ethyl and, in particular, methyl groups, 2 alkoxy groups having 1 to 4 carbon atoms such as ethoxy and, in particular, methoxy groups, 1 alkanoylamino group having 2 to 4 carbon atoms such as the propionylamino and, in particular, the acetylamino group, and 2 chlorine atoms, at least one of these substituents being a sulfo group or carboxy group, or D is the 1- or 2-naphthyl radical, preferably the 2naphthyl radical, which are substituted by 2 or 3 sulfo groups;

E is the 1,4-phenylene radical, the azo group which is linked to D being bonded to E in the 4-position and the azo group which is linked to K being bonded to E in the 1-position, which is substituted by 1 or 2 substituents, the substituents being selected from the following set of substituents: 2 alkyl groups having 1 to 4 carbon atoms such as ethyl and, in particular, methyl groups, 2 alkoxy groups having 1 to 4 carbon atoms such as ethoxy and, in particular, methoxy groups, 1 alkanoylamino group having 2 to 4 carbon atoms such as the propionylamino group and, in particular, the acetylamino group, 1 ureido group and 1 chlorine atom, or E is the 1,4-naphthylene radical, the azo group which is linked to D being bonded to E in the 4-position and the azo group which is linked to K being bonded to E in the 1-position, which can be substituted by 1 or 2 sulfo groups, preferably 1 sulfo group;

K is the 1,4-phenylene radical, the azo group which is linked to E being bonded to K in the 4-position and the benzoylamido group being bonded to K in the 1position and the phenylene radical being substituted by 1 or 2 substituents, the substituents being selected from the following set of substituents: 2 alkyl groups having 1 to 4 carbon atoms such as ethyl and, in particular, methyl groups, 2 alkoxy groups having 1 to 4 carbon atoms such as ethoxy and, in particular, methoxy groups, 1 alkanoylamino group having 2 to 4 carbon atoms such as the propionylamino group and, in particular, the acetylamino group, 1 ureido group and 1 chlorine atom, or K is the 1,4-naphthylene radical, the azo group which is linked to E being bonded to K in the 4-position and the benzoylamido group being bonded to K in the 1-position and it being possible for the naphthylene radical to be substituted by 1 or 2 sulfo groups, preferably 1 sulfo group;

A is a direct covalent bond or the methylene group or a substituted amino group of the general formula —N(R)—, wherein R denotes an alkyl group having 1 to 4 carbon atoms such as the ethyl group and, in particular, the methyl group, or denotes the 8-cyanoethyl group with the proviso that K is 1,4-naphthylene if A is the group —N(R)—, A preferably being a direct covalent bond;

Y is the vinyl group or the 8-chloroethyl group.

In the disazo compounds of the general formula (1), D is, for example, the 4,6,8-trisulfo-2-naphthyl, 3,6,8-trisulfo- 2-naphthyl, 2,5,7-trisulfo-1-naphthyl, 1,5-disulfo2-naphthyl, 1,6-disulfo-2-naphthyl, 4,8-disulfo-2-naphthyl, 3,6-disulfo-2-naphthyl, 3,7-disulfo-2-napht-hyl, 5,7-disulfo-2-naphthyl, 6,8-disulfo-2-naphthyl, 2,5- disulfo-phenyl, 4-methyl-2,5-disulfo-phenyl, 4-methoxy-2,5-disulfo-phenyl, 4-acetylamino-2,5-disulfophenyl and 4-acetylamino-2,6-disulfo-phenyl group, of these preferably the 3,6,8-trisulfo-2-naphthyl, 4,6,8-trisulfo-2-naphthyl, 4,8-disulfo-2-naphthyl, 2,5-disulfo-phenyl, 4-methyl-2,5-disulfo-phenyl, 4-methoxy-2,5-disulfo-phenyl and the 4-acetylamino-2,5-disulfophenyl group.

Radicals E in the general formula (1) are, for example, the 8-sulfo-1,4-naphthylene group, the 6-sulfo-1,4-naphthylene and the 7-sulfo-1,4-naphthylene group and also a mixture of the 6- and 7-sulfo-1,4-naphthylene radicals, the 2-methoxy-5-methyl-1,4-phenylene, 2,5-dimethyl-1,4-phenylene, 3-methyl-1,4-phenylene, 3-acetylamino-1,4-phenylene, 3-ureido-1,4-phenylene, 2-chloro-5-methyl-1,4-phenylene group, of these particularly preferably the 6-sulfo- or 7-sulfo-1,4-naphthylene group or a mixture of these two groups.

Radicals K in the general formula (1) are, for example, the 8-sulfo-1,4-naphthylene, 6-sulfo-1,4-naphthylene and the 7-sulfo-1,4-naphthylene group and also a mixture of the 6- and 7-sulfo-1,4-naphthylene radicals, the 2-methoxy-5-methyl-1,4-phenylene, 2,5-dimethyl-1,4-phenylene, 3-methyl-1,4-phenylene, 3-acetylamino-1,4-phenylene, 3-ureido-1,4-phenylene, 2-chloro-5-methyl-1,4-phenylene group, of these preferably the 6-sulfo- or 8-sulfo-1,4-naphthylene group, the 2-methoxy-5-methyl-1,4-phenylene and the 3-methyl-1,4-phenylene group.

Preferably the group $-A-SO_2-Y$ is bonded to the benzene nucleus in the meta- or para-position with respect to the carbonylamido group.

Hereinbefore and hereinafter, a sulfo group denotes a group according to the general formula $-SO_3M$ and a carboxy group denotes a group of the general formula $-COOM$, in which M has the meaning given hereinafter.

Preference is given to those disazo compounds according to the invention which correspond to the general formulae (1a), (1b), (1C) and (1d)

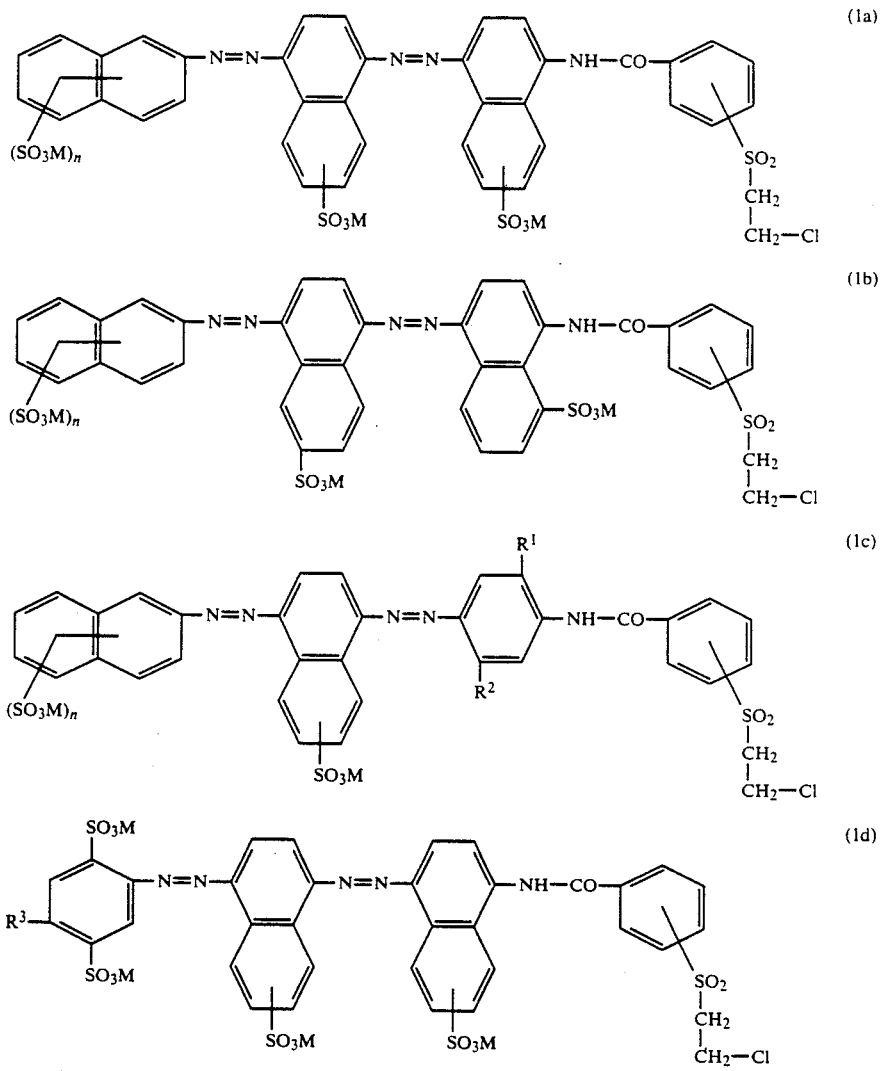

in which the symbols have the following meanings:
M is a hydrogen atom or a salt-forming metal such as an alkaline earth metal such as calcium or, preferably, an alkali metal such as sodium, potassium or lithium;
n is the number 2 or 3;
$R^1$ is a hydrogen atom, the methyl group or methoxy group;
$R^2$ is the methyl group or the acetylamino or ureido group;

R³ is a hydrogen atom, the methyl, methoxy or acetylamino group.

The disazo compounds according to the invention can be present in the form of their free acid and in the form of their salts, preferably alkali metal salts. They are used preferably in the form of these salts for dyeing or printing hydroxy- and/or carboxamido-containing material, in particular fiber material.

The present invention further relates to a process for preparing the disazo compounds according to the invention. It comprises reacting an aminodisazo compound of the general formula (2)

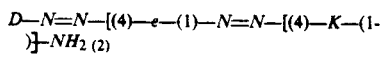

in which D, E and K have the abovementioned meanings and the amino group is bonded to K in the 4-position, with a carboxylic acid chloride of the general formula (3)

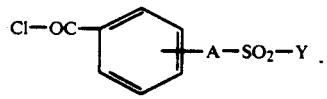

in which A and Y have the abovementioned meanings and the group —A—SO₂—Y is bonded to the benzene nucleus preferably in the meta- or para-position with respect to the carboxylic acid chloride group.

The reaction of the aminodisazo compounds of the general formula (2) with the acid chlorides of the general formula (3) is carried out analogously to methods which are known per se and which have been described, for example, in U.S. Pat. Nos. 3,098,096 and 4,473,498. Thus, the reaction is carried out in an aqueous-organic or, preferably, in a purely aqueous medium; the organic solvent components used are conventional organic solvents which are inert towards the reactants and are capable of dissolving the acid chloride. Organic solvents of this type are, for example, toluene, chlorobenzene, dichloroethane and acetone. The reaction is generally carried out at a pH between 4 and 7, preferably between 5 and 6, and at a temperature between 10° and 70° C., preferably between 20° and 30° C. The carboxylic acid chloride starting compound can be added to the reaction mixture as a solid or a melt or in the form of a solution in the organic solvent.

Suitable acid chlorides according to the general formula (3) are, for example, 3-(β-chloroethylsulfonyl)-benzoyl chloride, 4-(β-chloroethylsulfonyl)-benzoyl chloride, 3-[(β-chloroethylsulfonyl)-methyl]-benzoyl chloride, 4[(β-chloroethylsulfonyl)-methyl]-benzoyl chloride, 3-[N-methyl-N-(β-chloroethylsulfonyl)]-benzoyl chloride and 4-[N-methyl-N-(β-chloroethylsulfonyl)]-benzoyl chloride, furthermore also 3-[N-(β-cyanoethyl)-N-(β-chloroethylsulfonyl)]-amino-benzoyl chloride, 3-vinylsulfonyl-benzoyl chloride and 4-vinylsulfonyl-benzoyl chloride.

The aminodisazo starting compounds of the general formula (2) are known, for example, from U.S. Pat. No. 3,950,128, EP-A-042,108 and EP-A-0,202,570 mentioned at the beginning, and from Colour Index, 3rd edition, Volume 4, C. I. Nos. 26,300, 26,305, 26,310, 26,315 and 26,320, or can be prepared analogously to these aminodisazo starting compounds described per se. The benzoyl chloride starting compounds of the general formula (3) are described, for example, in U.S. Pat. Nos. 4,473,498 and 3,305,559 and in British Patent 1,438,051.

The separation of the disazo compounds of the general formula (1) prepared according to the invention from their synthesis mixtures is carried out by generally known methods, such as, for example, by precipitation from the reaction medium by means of an electrolyte salt such as, for example, sodium chloride or potassium chloride, or by evaporation of the reaction solution, for example by spray-drying, in the course of which a buffer substance and/or a solubilizing agent can be added to this synthesis solution. The new disazo compounds of the general formula (1) have very good fiber-reactive dyestuff properties and can therefore be used for dyeing hydroxy- and/or carboxamido-containing material, for example in the form of sheetlike structures such as films and paper, and also leather, or in the mass such as polyamide and polyurethane, but in particular materials in fiber form. Likewise, the solutions which are formed in the synthesis of the compounds according to the invention, with or without the addition of a buffer substance and/or a solubilizing agent and with or without concentration of the solution, can be directly used as a liquid formulation for dyeing purposes.

Therefore, the present invention also relates to the use of the compounds of the general formula (1) according to the invention for dyeing these materials (including mass coloration and printing) and processes for dyeing these materials by a method which is customary per se, in which a compound of the general formula (1) is used as the colorant. Preferably, the materials are used in the form of fiber materials, in particular in the form of textile fibers.

Hydroxy-containing materials are natural or synthetic hydroxy-containing materials such as, for example, cellulose fiber materials or regeneration products thereof and polyvinyl alcohols. Cellulose fiber materials are preferably cotton, but also other plant fibers such as linen, hemp, jute and ramie fibers; regenerated cellulose fibers are, for example, staple viscose and filament viscose.

Carboxamido-containing materials are, for example, synthetic and natural polyamides and polyurethanes, in particular in the form of fibers, for example wool and other animal hair, silk, leather, nylon 66, nylon 6, nylon 11 and nylon 4.

The compounds of the formula (1) according to the invention can be applied to the substrates mentioned, in particular to the fiber materials mentioned, and fixed by the application procedures known for water-soluble dyestuffs, in particular for fiber-reactive dyestuffs.

Such application and fixation methods in the printing and dyeing industry for fiber-reactive dyestuffs are generally known and described in the technical and patent literature such as, for example, in U.S. Pat. No. 4,473,498 which has already been mentioned. The dyeings and prints obtainable by the disazo compounds according to the invention have very good light fastness properties on dry fabric or fabric which has been moistened by drinking water or an acid or alkaline perspiration solution, furthermore good wet fastness properties such as, for example, in 60° C. and 95° C. washings, including peroxide washing, good alkaline and acid perspiration fastness properties, good water fastness properties, chlorinated water fastness properties and resistance to acid fading, furthermore good nitrogen oxide, gas fume and rubbing fastness properties. The disazo compounds according to the invention dye, by the exhaust process, even at 40° C. the materials mentioned in strong yellowish to bluish brown shades having a very good color buildup. The prints obtainable thereby have a very good white ground and show sharp outlines.

The following Examples serve to illustrate the invention. The compounds described by formula are given in the form of the free acids. In general, they are prepared and isolated in the form of their sodium or potassium salts and used for dyeing in the form of their salts. Likewise, the starting compounds mentioned in the following Examples, in particular Table Examples, in the form of the free acid can be used in the synthesis as such or in the form of their salts, preferably alkali metal salts such as sodium or potassium salts. The absorption maximum ($\lambda_{max}$) has been determined in aqueous solution. Parts and percentages mentioned in the Examples are by weight, unless noted otherwise. Parts by weight relate to parts by volume as the kilogram relates to the liter.

EXAMPLE 1

44.9 parts of the sodium salt of 2-naphthylamine-4,6,8-trisulfonic acid are diazotized in the usual manner (for example by pouring a solution thereof in 100 parts of water which additionally contains 7 parts of sodium nitrite into a mixture of 200 parts of ice and 7 parts by volume of concentrated sulfuric acid). After the diazotization reaction is complete and excess nitrite has been destroyed, a neutral solution of 22.3 parts of 1-naphthylamine-6-sulfonic acid in 200 parts of water are added to the mixture, the pH is adjusted to 3.5, and the mixture is stirred until the coupling reaction is completed. 100 parts of ice and 10 parts of concentrated sulfuric acid are added to the solution of the aminoazo compound formed, and the aminoazo compound is diazotized by means of about 20 parts by volume of an aqueous 5N sodium nitrite solution. 22.3 parts of 1-naphthylamine-8-sulfonic acid are then added as the second coupling component, the coupling reaction being carried out at a pH between 3 and 4 and a temperature between 10° and 20° C. The reaction mixture is then clarified in the usual manner. 32 parts of 3-($\beta$-chloroethylsulfonyl)-benzoyl chloride are then added to the clarified solution of the aminodisazo compound maintaining a pH between 5 and 6 and at a temperature between 15° and 25° C. over the course of 1 to 2 hours with stirring. During this time, the progression of the acylation reaction can be monitored by conventional thin layer or paper chromatography (disappearance of the blue aminodisazo starting compound).

After the acylation reaction is finished, the reaction mixture is clarified again, the mixture is adjusted to a pH of 4.5 and evaporated or spray-dried. The dark brown product obtainable therefrom and containing electrolyte salt contains the compound according to the invention (as the sodium salt) corresponding to the formula

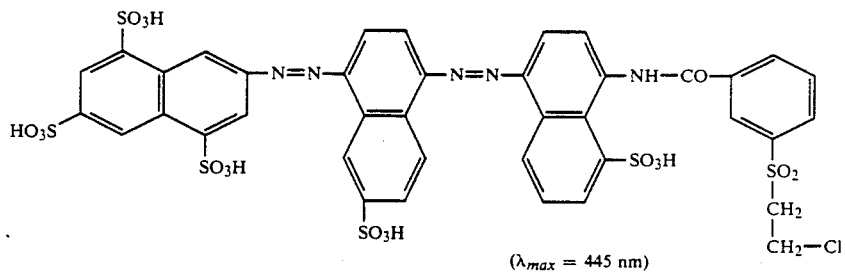

($\lambda_{max}$ = 445 nm)

which has very good dyestuff properties and gives, by the application and fixation methods known for fiber-reactive dyestuffs, for example on polyamide fibers in a weakly acidic pH range and on cellulose fibers in a neutral to strongly alkaline range, strong dyeings and prints in a color-fast, purplish brown shade. The dyeings and prints are distinguished by good wet fastness properties such as, for example, by good washing, water, alkaline and acid perspiration, chlorinated water and chlorine bleach fastness properties, furthermore by good gas fume fastness properties and by good lightfastness properties on dry fabric or fabric impregnated with drinking water or with an alkaline perspiration solution. Printing on cellulose fiber materials both by the customary one-phase and also two-phase printing process gives strong prints with sharp outlines and a pure white ground since the unfixed dyestuff portions can be easily washed out.

EXAMPLES 2 to 108

In the following Table Examples, further disazo compounds according to the invention are described by means of the formula members corresponding to the general formula (A)

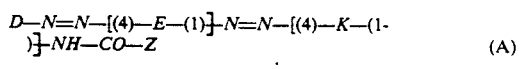

They can be prepared according to the invention, for ex. analogously to the above Working Example. They have good fiber-reactive dyestuff properties and give, on the fiber materials mentioned in the description, in particular on cellulose fiber materials under neutral to strongly alkaline fixation conditions, strong dyeings and prints in the hue mentioned under the respective Table Example (the numbers given in parentheses represent the absorption maximum in term of nm in the visible range).

| | | Disazo compound of formula (A) | | | |
|---|---|---|---|---|---|
| Example | Radical D- | Radical -E- | Radical -K- | Radical -Z | Hue |
| 2 | 4,6,8-trisulfo-2-naphthyl | 6-sulfo-1,4-naphthylene | 8-sulfo-1,4-naphthylene | 3-vinylsulfonylphenyl | bluish brown |
| 3 | 4,6,8-trisulfo-2-naphthyl | 6-sulfo-1,4-naphthylene | 6-sulfo-1,4-naphthylene | 3-($\beta$-chloroethyl-sulfonyl)-phenyl | " |
| 4 | 4,6,8-trisulfo-2-naphthyl | (6 + 7)-sulfo-1,4-naphthylene | 6-sulfo-1,4-naphthylene | 3-($\beta$-chloroethyl-sulfonyl)-phenyl | " |

-continued

| | Disazo compound of formula (A) | | | | |
|---|---|---|---|---|---|
| Example | Radical D- | Radical -E- | Radical -K- | Radical -Z | Hue |
| 5 | 4,6,8-trisulfo-2-naphthyl | 2-methoxy-5-methyl-1,4-phenylene | 6-sulfo-1,4-naphthylene | 3-($\beta$-chloroethyl-sulfonyl)-phenyl | brown |
| 6 | 4,6,8-trisulfo-2-naphthyl | 6-sulfo-1,4-naphthylene | 6-sulfo-1,4-naphthylene | 3-($\beta$-chloroethyl-sulfonyl)-phenyl | bluish brown |
| 7 | 4,6,8-trisulfo-2-naphthyl | 6-sulfo-1,4-naphthylene | 6-sulfo-1,4-naphthylene | 4-($\beta$-chloroethyl-sulfonyl)-phenyl | " |
| 8 | 4,6,8-trisulfo-2-naphthyl | 6-sulfo-1,4-naphthylene | 8-sulfo-1,4-naphthylene | 4-($\beta$-chloroethyl-sulfonyl)-phenyl | " |
| 9 | 4,6,8-trisulfo-2-naphthyl | (6 + 7)-sulfo-1,4-naphthylene | 8-sulfo-1,4-naphthylene | 4-($\beta$-chloroethyl-sulfonyl)-phenyl | " |
| 10 | 4,6,8-trisulfo-2-naphthyl | (6 + 7)-sulfo-1,4-naphthylene | 8-sulfo-1,4-naphthylene | 3-[($\beta$-chloroethyl-sulfonyl)-methyl]-phenyl | " |
| 11 | 4,6,8-trisulfo-2-naphthyl | (6 + 7)-sulfo-1,4-naphthylene | 8-sulfo-1,4-naphthylene | 4-[($\beta$-chloroethyl-sulfonyl)-methyl]-phenyl | " |
| 12 | 4,6,8-trisulfo-2-naphthyl | (6 + 7)-sulfo-1,4-naphthylene | 8-sulfo-1,4-naphthylene | 4-[N-methyl-N-($\beta$-chloroethylsulfonyl)-amino]-phenyl | bluish brown |
| 13 | 4,6,8-trisulfo-2-naphthyl | (6 + 7)-sulfo-1,4-naphthylene | 8-sulfo-1,4-naphthylene | 3-[N-methyl-N-($\beta$-chloroethylsulfonyl)-amino]-phenyl | " |
| 14 | 4,6,8-trisulfo-2-naphthyl | 6-sulfo-1,4-naphthylene | 8-sulfo-1,4-naphthylene | 4-[N-methyl-N-($\beta$-chloroethylsulfonyl)-amino]-phenyl | " |
| 15 | 4,6,8-trisulfo-2-naphthyl | 6-sulfo-1,4-naphthylene | 6-sulfo-1,4-naphthylene | 4-[($\beta$-chloroethyl-sulfonyl)-methyl]-phenyl | " |
| 16 | 3,6,8-trisulfo-2-naphthyl | 1,4-naphthylene | 8-sulfo-1,4-naphthylene | 3-($\beta$-chloroethyl-sulfonyl)-phenyl | " |
| 17 | 3,6,8-trisulfo-2-naphthyl | 1,4-naphthylene | 8-sulfo-1,4-naphthylene | 4-($\beta$-chloroethyl-sulfonyl)-phenyl | " |
| 18 | 3,6,8-trisulfo-2-naphthyl | 6-sulfo-1,4-naphthylene | 8-sulfo-1,4-naphthylene | 4-vinylsulfonylphenyl | " |
| 19 | 3,6,8-trisulfo-2-naphthyl | 6-sulfo-1,4-naphthylene | 6-sulfo-1,4-naphthylene | 4-($\beta$-chloroethyl-sulfonyl)-phenyl | " |
| 20 | 3,6,8-trisulfo-2-naphthyl | (6 + 7)-sulfo-1,4-naphthylene | 6-sulfo-1,4-naphthylene | 4-($\beta$-chloroethyl-sulfonyl)-phenyl | " |
| 21 | 3,6,8-trisulfo-2-naphthyl | 2,5-dimethyl-1,4-phenylene | 6-sulfo-1,4-naphthylene | 4-($\beta$-chloroethyl-sulfonyl)-phenyl | brown |
| 22 | 3,6,8-trisulfo-2-naphthyl | 2,5-dimethyl-1,4-phenylene | 6-sulfo-1,4-naphthylene | 3-($\beta$-chloroethyl-sulfonyl)-phenyl | brown |
| 23 | 3,6,8-trisulfo-2-naphthyl | 6-sulfo-1,4-naphthylene | 8-sulfo-1,4-naphthylene | 3-[($\beta$-chloroethyl-sulfonyl)-methyl]-phenyl | bluish brown |
| 24 | 3,6,8-trisulfo-2-naphthyl | 6-sulfo-1,4-naphthylene | 8-sulfo-1,4-naphthylene | 4-[N-methyl-N-($\beta$-chloroethylsulfonyl)]-amino-phenyl | " |
| 25 | 3,6,8-trisulfo-2-naphthyl | 6-sulfo-1,4-naphthylene | 8-sulfo-1,4-naphthylene | 4-(N-methyl-N-vinyl-sulfonyl)-amino-phenyl | " |
| 26 | 2,5,7-trisulfo-1-naphthyl | 1,4-naphthylene | 8-sulfo-1,4-naphthylene | 3-($\beta$-chloroethyl-sulfonyl)-phenyl | " |
| 27 | 2,5,7-trisulfo-1-naphthyl | 1,4-naphthylene | 6-sulfo-1,4-naphthylene | 4-($\beta$-chloroethyl-sulfonyl)-phenyl | " |
| 28 | 2,5,7-trisulfo-1-naphthyl | 1,4-naphthylene | 6-sulfo-1,4-naphthylene | 3-($\beta$-chloroethyl-sulfonyl)-phenyl | " |
| 29 | 1,5-disulfo-2-naphthyl | 6-sulfo-1,4-naphthylene | 6-sulfo-1,4-naphthylene | 3-($\beta$-chloroethyl-sulfonyl)-phenyl | reddish brown |
| 30 | 1,5-disulfo-2-naphthyl | 6-sulfo-1,4-naphthylene | 8-sulfo-1,4-naphthylene | 3-($\beta$-chloroethyl-sulfonyl)-phenyl | " |
| 31 | 1,5-disulfo-2-naphthyl | 6-sulfo-1,4-naphthylene | 8-sulfo-1,4-naphthylene | 4-($\beta$-chloroethyl-sulfonyl)-phenyl | " |
| 32 | 1,5-disulfo-2-naphthyl | (6 + 7)-sulfo-1,4-naphthylene | 8-sulfo-1,4-naphthylene | 4-($\beta$-chloroethyl-sulfonyl)-phenyl | " |
| 33 | 1,5-disulfo-2-naphthyl | (6 + 7)-sulfo-1,4-naphthylene | 8-sulfo-1,4-naphthylene | 3-($\beta$-chloroethyl-sulfonyl)-phenyl | reddish brown |
| 34 | 1,6-disulfo-2-naphthyl | 6-sulfo-1,4-naphthylene | 6-sulfo-1,4-naphthylene | 3-($\beta$-chloroethyl-sulfonyl)-phenyl | " |
| 35 | 1,6-disulfo-2-naphthyl | 6-sulfo-1,4-naphthylene | 6-sulfo-1,4-naphthylene | 4-($\beta$-chloroethyl-sulfonyl)-phenyl | " |
| 36 | 1,6-disulfo-2-naphthyl | 6-sulfo-1,4-naphthylene | 8-sulfo-1,4-naphthylene | 3-($\beta$-chloroethyl-sulfonyl)-phenyl | " |
| 37 | 1,6-disulfo-2-naphthyl | 6-sulfo-1,4-naphthylene | 8-sulfo-1,4-naphthylene | 4-($\beta$-chloroethyl-sulfonyl)-phenyl | bluish brown |
| 38 | 4,8-disulfo-2-naphthyl | 6-sulfo-1,4-naphthylene | 8-sulfo-1,4-naphthylene | 4-($\beta$-chloroethyl-sulfonyl)-phenyl | " |
| 39 | 4,8-disulfo-2-naphthyl | 6-sulfo-1,4-naphthylene | 8-sulfo-1,4-naphthylene | 3-($\beta$-chloroethyl-sulfonyl-methyl)- | " |

-continued

| | Disazo compound of formula (A) | | | | |
|---|---|---|---|---|---|
| Example | Radical D- | Radical -E- | Radical -K- | Radical -Z | Hue |
| 40 | 4,8-disulfo-2-naphthyl | 6-sulfo-1,4-naphthylene | 6-sulfo-1,4-naphthylene | 3-(β-chloroethyl-sulfonyl)-phenyl | bluish brown (446) |
| 41 | 4,8-disulfo-2-naphthyl | 6-sulfo-1,4-naphthylene | 6-sulfo-1,4-naphthylene | 4-(β-chloroethyl-sulfonyl)-phenyl | bluish brown |
| 42 | 4,8-disulfo-2-naphthyl | 6-sulfo-1,4-naphthylene | 6-sulfo-1,4-naphthylene | 4-[(β-chloroethyl-sulfonyl)-methyl]-phenyl | " |
| 43 | 4,8-disulfo-2-naphthyl | 6-sulfo-1,4-naphthylene | 6-sulfo-1,4-naphthylene | 4-[N-methyl-N-(β-chloroethylsulfonyl)]-amino-phenyl | bluish brown |
| 44 | 4,8-disulfo-2-naphthyl | 6-sulfo-1,4-naphthylene | 8-sulfo-1,4-naphthylene | 4-(β-chloroethyl-sulfonyl)-phenyl | " |
| 45 | 4,8-disulfo-2-naphthyl | 6-sulfo-1,4-naphthylene | 8-sulfo-1,4-naphthylene | 3-(β-chloroethyl-sulfonyl)-phenyl | " |
| 46 | 3,6-disulfo-2-naphthyl | 6-sulfo-1,4-naphthylene | 8-sulfo-1,4-naphthylene | 3-(β-chloroethyl-sulfonyl)-phenyl | reddish brown |
| 47 | 3,6-disulfo-2-naphthyl | 6-sulfo-1,4-naphthylene | 8-sulfo-1,4-naphthylene | 4-(β-chloroethyl-sulfonyl)-phenyl | " |
| 48 | 3,7-disulfo-2-naphthyl | 6-sulfo-1,4-naphthylene | 8-sulfo-1,4-naphthylene | 4-(β-chloroethyl-sulfonyl)-phenyl | " |
| 49 | 3,7-disulfo-2-naphthyl | 6-sulfo-1,4-naphthylene | 8-sulfo-1,4-naphthylene | 3-(β-chloroethyl-sulfonyl)-phenyl | " |
| 50 | 5,7-disulfo-2-naphthyl | 6-sulfo-1,4-naphthylene | 8-sulfo-1,4-naphthylene | 3-(β-chloroethyl-sulfonyl)-phenyl | " |
| 51 | 5,7-disulfo-2-naphthyl | 6-sulfo-1,4-naphthylene | 8-sulfo-1,4-naphthylene | 4-(β-chloroethyl-sulfonyl)-phenyl | " |
| 52 | 6,8-disulfo-2-naphthyl | 6-sulfo-1,4-naphthylene | 8-sulfo-1,4-naphthylene | 4-(β-chloroethyl-sulfonyl)-phenyl | bluish brown |
| 53 | 6,8-disulfo-2-naphthyl | 6-sulfo-1,4-naphthylene | 8-sulfo-1,4-naphthylene | 3-(β-chloroethyl-sulfonyl)-phenyl | bluish brown |
| 54 | 2,5-disulfo-phenyl | 6-sulfo-1,4-naphthylene | 8-sulfo-1,4-naphthylene | 3-(β-chloroethyl-sulfonyl)-phenyl | reddish brown |
| 55 | 2,5-disulfo-phenyl | 6-sulfo-1,4-naphthylene | 8-sulfo-1,4-naphthylene | 4-(β-chloroethyl-sulfonyl)-phenyl | " |
| 56 | 4-methyl-2,5-disulfo-phenyl | 6-sulfo-1,4-naphthylene | 8-sulfo-1,4-naphthylene | 3-(β-chloroethyl-sulfonyl)-phenyl | " |
| 57 | 4-methyl-2,5-disulfo-phenyl | 6-sulfo-1,4-naphthylene | 8-sulfo-1,4-naphthylene | 3-(β-chloroethyl-sulfonyl)-phenyl | " |
| 58 | 4-methyl-2,5-disulfo-phenyl | 6-sulfo-1,4-naphthylene | 6-sulfo-1,4-naphthylene | 3-(β-chloroethyl-sulfonyl)-phenyl | " |
| 59 | 4-methyl-2,5-disulfo-phenyl | 6-sulfo-1,4-naphthylene | 6-sulfo-1,4-naphthylene | 4-(β-chloroethyl-sulfonyl)-phenyl | " |
| 60 | 4-methoxy-2,5-disulfo-phenyl | 6-sulfo-1,4-naphthylene | 8-sulfo-1,4-naphthylene | 3-(β-chloroethyl-sulfonyl)-phenyl | " |
| 61 | 4-methoxy-2,5-disulfo-phenyl | 6-sulfo-1,4-naphthylene | 8-sulfo-1,4-naphthylene | 4-(β-chloroethyl-sulfonyl)-phenyl | " |
| 62 | 4-acetylamino-2,5-disulfo-phenyl | 6-sulfo-1,4-naphthylene | 8-sulfo-1,4-naphthylene | 4-(β-chloroethyl-sulfonyl)-phenyl | bluish brown |
| 63 | 4-acetylamino-2,5-disulfo-phenyl | 6-sulfo-1,4-naphthylene | 8-sulfo-1,4-naphthylene | 3-(β-chloroethyl-sulfonyl)-phenyl | " |
| 64 | 4-acetylamino-2,6-disulfo-phenyl | 6-sulfo-1,4-naphthylene | 8-sulfo-1,4-naphthylene | 3-(β-chloroethyl-sulfonyl)-phenyl | bluish brown |
| 65 | 4-acetylamino-2,6-disulfo-phenyl | 6-sulfo-1,4-naphthylene | 8-sulfo-1,4-naphthylene | 4-(β-chloroethyl-sulfonyl)-phenyl | " |
| 66 | 4-acetylamino-2,6-disulfo-phenyl | 6-sulfo-1,4-naphthylene | 6-sulfo-1,4-naphthylene | 4-(β-chloroethyl-sulfonyl)-phenyl | " |
| 67 | 4-acetylamino-2,6-disulfo-phenyl | (6 + 7)-sulfo-1,4-naphthylene | 6-sulfo-1,4-naphthylene | 4-(β-chloroethyl-sulfonyl)-phenyl | " |
| 68 | 4-acetylamino-2,6-disulfo-phenyl | (6 + 7)-sulfo-1,4-naphthylene | 6-sulfo-1,4-naphthylene | 3-(β-chloroethyl-sulfonyl)-phenyl | " |
| 69 | 2,4-disulfo-phenyl | (6 + 7)-sulfo-1,4-naphthylene | 6-sulfo-1,4-naphthylene | 3-(β-chloroethyl-sulfonyl)-phenyl | " |
| 70 | 2,4-disulfo-phenyl | 6-sulfo-1,4-naphthylene | 8-sulfo-1,4-naphthylene | 3-(β-chloroethyl-sulfonyl)-phenyl | " |
| 71 | 2,4-disulfo-phenyl | 6-sulfo-1,4-naphthylene | 8-sulfo-1,4-naphthylene | 4-(β-chloroethyl-sulfonyl)-phenyl | " |
| 72 | 4,6,8-trisulfo-2-naphthyl | 2-methoxy-5-methyl-1,4-phenylene | 8-sulfo-1,4-naphthylene | 4-(β-chloroethyl-sulfonyl)-phenyl | " |
| 73 | 4,6,8-trisulfo-2-naphthyl | 2,5-dimethyl-1,4-phenylene | 8-sulfo-1,4-naphthylene | 4-(β-chloroethyl-sulfonyl)-phenyl | " |
| 74 | 4,6,8-trisulfo-2-naphthyl | 6-sulfo-1,4-naphthylene | 3-methyl-1,4-phenylene | 4-(β-chloroethyl-sulfonyl)-phenyl | bluish brown |
| 75 | 3,6,8-trisulfo-2-naphthyl | 6-sulfo-1,4-naphthylene | 3-methyl-1,4-phenylene | 4-(β-chloroethyl-sulfonyl)-phenyl | " |
| 76 | 3,6,8-trisulfo-2-naphthyl | 2-methoxy-5-methyl-1,4-phenylene | 8-sulfo-1,4-naphthylene | 4-(β-chloroethyl-sulfonyl)-phenyl | " |
| 77 | 3,6,8-trisulfo- | 2,5-dimethyl- | 8-sulfo-1,4- | 4-(β-chloroethyl- | " |

-continued

| Example | Radical D- | Radical -E- | Radical -K- | Radical -Z | Hue |
|---|---|---|---|---|---|
| | 2-naphthyl | 1,4-phenylene | naphthylene | sulfonyl)-phenyl | |
| 78 | 2,5,7-trisulfo-1-naphthyl | 2,5-dimethyl-1,4-phenylene | 8-sulfo-1,4-naphthylene | 4-(β-chloroethyl-sulfonyl)-phenyl | " |
| 79 | 2,5,7-trisulfo-1-naphthyl | 2-methoxy-5-methyl-1,4-phenylene | 6-sulfo-1,4-naphthylene | 4-(β-chloroethyl-sulfonyl)-phenyl | " |
| 80 | 2,5,7-trisulfo-1-naphthyl | 6-sulfo-1,4-naphthylene | 3-methyl-1,4-phenylene | 4-(β-chloroethyl-sulfonyl)-phenyl | reddish brown |
| 81 | 2,5,7-trisulfo-1-naphthyl | 6-sulfo-1,4-naphthylene | 3-acetylamino-1,4-phenylene | 4-(β-chloroethyl-sulfonyl)-phenyl | " |
| 82 | 1,5-disulfo-2-naphthyl | 6-sulfo-1,4-naphthylene | 3-methyl-1,4-phenylene | 4-(β-chloroethyl-sulfonyl)-phenyl | " |
| 83 | 1,5-disulfo-2-naphthyl | 2-methoxy-5-methyl-1,4-phenylene | 6-sulfo-1,4-naphthylene | 4-(β-chloroethyl-sulfonyl)-phenyl | " |
| 84 | 1,5-disulfo-2-naphthyl | 2-methoxy-5-methyl-1,4-phenylene | 8-sulfo-1,4-naphthylene | 3-(β-chloroethyl-sulfonyl)-phenyl | reddish brown |
| 85 | 1,5-disulfo-2-naphthyl | 2-methoxy-5-methyl-1,4-phenylene | 8-sulfo-1,4-naphthylene | 4-(β-chloroethyl-sulfonyl)-phenyl | " |
| 86 | 1,6-disulfo-2-naphthyl | 2-methoxy-5-methyl-1,4-phenylene | 8-sulfo-1,4-naphthylene | 4-(β-chloroethyl-sulfonyl)-phenyl | " |
| 87 | 1,6-disulfo-2-naphthyl | 6-sulfo-1,4-naphthylene | 3-acetylamino-1,4-phenylene | 4-(β-chloroethyl-sulfonyl)-phenyl | " |
| 88 | 1,6-disulfo-2-naphthyl | 6-sulfo-1,4-naphthylene | 3-acetylamino-1,4-phenylene | 3-(β-chloroethyl-sulfonyl)-phenyl | " |
| 89 | 4,8-disulfo-2-naphthyl | 6-sulfo-1,4-naphthylene | 3-acetylamino-1,4-phenylene | 4-(β-chloroethyl-sulfonyl)-phenyl | " |
| 90 | 4,8-disulfo-2-naphthyl | 2,5-dimethyl-1,4-phenylene | 6-sulfo-1,4-naphthylene | 4-(β-chloroethyl-sulfonyl)-phenyl | " |
| 91 | 4,8-disulfo-2-naphthyl | 2,5-dimethyl-1,4-phenylene | 8-sulfo-1,4-naphthylene | 4-(β-chloroethyl-sulfonyl)-phenyl | " |
| 92 | 4,8-disulfo-2-naphthyl | 2-methoxy-5-methyl-1,4-phenylene | 8-sulfo-1,4-naphthylene | 4-(β-chloroethyl sulfonyl)-phenyl | " |
| 93 | 4,8-disulfo-1,4-naphthyl | 6-sulfo-1,4-naphthylene | 3-methyl-1,4-phenylene | 4-(β-chloroethyl-sulfonyl)-phenyl | reddish brown |
| 94 | 3,6-disulfo-2-naphthyl | 6-sulfo-1,4-naphthylene | 3-methyl-1,4-phenylene | 4-(β-chloroethyl-sulfonyl)-phenyl | " |
| 95 | 3,7-disulfo-2-naphthyl | 6-sulfo-1,4-naphthylene | 3-methyl-1,4-phenylene | 4-(β-chloroethyl-sulfonyl)-phenyl | " |
| 96 | 5,7-disulfo-2-naphthyl | 6-sulfo-1,4-naphthylene | 3-methyl-1,4-phenylene | 4-(β-chloroethyl-sulfonyl)-phenyl | " |
| 97 | 6,8-disulfo-2-naphthyl | 6-sulfo-1,4-naphthylene | 3-methyl-1,4-phenylene | 4-(β-chloroethyl-sulfonyl)-phenyl | " |
| 98 | 6,8-disulfo-2-naphthyl | 6-sulfo-1,4-naphthylene | 3-acetylamino-1,4-phenylene | 4-(β-chloroethyl-sulfonyl)-phenyl | " |
| 99 | 6,8-disulfo-2-naphthyl | 2-methoxy-5-methyl-1,4-phenylene | 6-sulfo-1,4-naphthylene | 4-(β-chloroethyl-sulfonyl)-phenyl | " |
| 100 | 6,8-disulfo-2-naphthyl | 2-methoxy-5-methyl-1,4-phenylene | 8-sulfo-1,4-naphthylene | 4-(β-chloroethyl-sulfonyl)-phenyl | " |
| 101 | 2,5-disulfo-phenyl | 2-methoxy-5-methyl-1,4-phenylene | 6-sulfo-1,4-naphthylene | 4-(β-chloroethyl-sulfonyl)-phenyl | " |
| 102 | 2,5-disulfo-phenyl | 2-methoxy-5-methyl-1,4-phenylene | (6 + 7)-sulfo-1,4-naphthylene | 4-(β-chloroethyl-sulfonyl)-phenyl | " |
| 103 | 2,5-disulfo-phenyl | 2,5-dimethyl-1,4-phenylene | (6 + 7)-sulfo-1,4-naphthylene | 4-(β-chloroethyl-sulfonyl)-phenyl | reddish brown |
| 104 | 4-methyl-2,5-disulfo-phenyl | 2,5-dimethyl-1,4-phenylene | (6 + 7)-sulfo-1,4-naphthylene | 4-(β-chloroethyl-sulfonyl)-phenyl | yellowish brown |
| 105 | 4-acetylamino-2,5-disulfo-phenyl | 2,5-dimethyl-1,4-phenylene | (6 + 7)-sulfo-1,4-naphthylene | 4-(β-chloroethyl-sulfonyl)-phenyl | reddish brown |
| 106 | 4-acetylamino-2,6-disulfo-phenyl | 2,5-dimethyl-1,4-phenylene | (6 + 7)-sulfo-1,4-phenylene | 4-(β-chloroethyl-sulfonyl)-phenyl | yellowish brown |
| 107 | 4-methoxy-2,6-disulfo-phenyl | 2,5-dimethyl-1,4-phenylene | (6 + 7)-sulfo-1,4-phenylene | 4-(β-chloroethyl-sulfonyl)-phenyl | " |
| 108 | 4-methoxy-2,6-disulfo-phenyl | 2,5-dimethyl-1,4-phenylene | (6 + 7)-sulfo-1,4-phenylene | 3-(β-chloroethyl-sulfonyl)-phenyl | " |
| 109 | 4,8-disulfo-2-naphthyl | (6 + 7)-sulfo-1,4-naphthylene | 8-sulfo-1,4-naphthylene | 4-(β-chloroethyl-sulfonyl)-phenyl | bluish brown (453) |
| 110 | 4,8-disulfo-2-naphthyl | (6 + 7)-sulfo-1,4-naphthylene | 8-sulfo-1,4-naphthylene | 4-[(β-chloroethyl-sulfonyl)-methyl]-phenyl | bluish brown (463) |
| 111 | 4,8-disulfo-2-naphthyl | (6 + 7)-sulfo-1,4-naphthylene | 8-sulfo-1,4-naphthylene | 3-(β-chloroethyl-sulfonyl)-phenyl | bluish brown (452) |

-continued

| | Disazo compound of formula (A) | | | |
|---|---|---|---|---|
| Example | Radical D- | Radical -E- | Radical -K- | Radical -Z | Hue |
| 112 | 4,6,8-trisulfo-2-naphthyl | (6 + 7)-sulfo-1,4-naphthylene | 8-sulfo-1,4-naphthylene | 3-($\beta$-chloroethyl-sulfonyl)-phenyl | bluish brown (487) |
| 113 | 4,6,8-trisulfo-2-naphthyl | 6-sulfo-1,4,-naphthylene | 3-methyl-1,4-phenylene | 3-($\beta$-chloroethyl-sulfonyl)-phenyl | yellowish brown (445) |
| 114 | 4,6,8-trisulfo-2-naphthyl | 6-sulfo-1,4-naphthylene | 2-methoxy-5-methyl-1,4-phenylene | 4-[($\beta$-chloroethyl-sulfonyl)-methyl]-phenyl | reddish brown (461) |
| 115 | 4,6,8-trisulfo-2-naphthyl | 6-sulfo-1,4-naphthylene | 3-methyl-1,4-phenylene | 4-[($\beta$-chloroethyl-sulfonyl)-methyl]-phenyl | yellowish brown (449) |
| 116 | 4,6,8-trisulfo-2-naphthyl | (6 + 7)-sulfo-1,4-naphthylene | 3-methyl-1,4-phenylene | 4-[($\beta$-chloroethyl-sulfonyl)-methyl]-phenyl | yellowish brown (453) |
| 117 | 4,6,8-trisulfo-2-naphthyl | (6 + 7)-sulfo-1,4-naphthylene | 3-methyl-1,4-phenylene | 3-($\beta$-chloroethyl-sulfonyl)-phenyl | yellowish brown (445) |
| 118 | 4,8-disulfo-2-naphthyl | 6-sulfo-1,4-naphthylene | 8-sulfo-1,4-naphthylene | 4-[($\beta$-chloroethyl-sulfonyl)-methyl]-phenyl | bluish brown |
| 119 | 4,8-disulfo-2-naphthyl | 6-sulfo-1,4-naphthylene | 3-methyl-1,4-phenylene | 4-[($\beta$-chloroethyl-sulfonyl)-methyl]-phenyl | yellowish brown |
| 120 | 4,8-disulfo-2-naphthyl | 6-sulfo-1,4-naphthylene | 3-methyl-1,4-phenylene | 3-($\beta$-chloroethyl-sulfonyl)-phenyl | yellowish brown |
| 121 | 3,6,8-trisulfo-2-naphthyl | 6-sulfo-1,4-naphthylene | 6-sulfo-1,4-naphthylene | 3-($\beta$-chloroethyl-sulfonyl)-phenyl | red-brown (454) |
| 122 | 3,6,8-trisulfo-2-naphthyl | 6-sulfo-1,4-naphthylene | 3-methyl-1,4-phenylene | 3-($\beta$-chloroethyl-(sulfonyl)-phenyl | yellow-brown (443) |
| 123 | 3,6,8-trisulfo-2-naphthyl | 6-sulfo-1,4-naphthylene | 3-methyl-1,4-phenylene | 4-[($\beta$-chloroethyl-sulfonyl)-methyl]-phenyl | yellow-brown (440) |
| 124 | 3,6,8-trisulfo-2-naphthyl | 6-sulfo-1,4-naphthylene | 2-methoxy-5-methyl-1,4-phenylene | 3-($\beta$-chloroethyl-sulfonyl)-phenyl | red-brown (454) |
| 125 | 3,6,8-trisulfo-2-naphthyl | 6-sulfo-1,4-naphthylene | 3-acetylamino-1,4-phenylene | 3-($\beta$-chloroethyl-sulfonyl)-phenyl | brown (450) |
| 126 | 3,6,8-trisulfo-2-naphthyl | 6-sulfo-1,4-naphthylene | 8-sulfo-1,4-naphthylene | 3-($\beta$-chloroethyl-sulfonyl)-phenyl | red-brown (456) |
| 127 | 3,6,8-trisulfo-2-naphthyl | 6-sulfo-1,4-naphthylene | 2-methoxy-5-methyl-1,4-phenylene | 4-[($\beta$-chloroethyl-sulfonyl)-methyl]-phenyl | red-brown (449) |
| 128 | 3,6,8-trisulfo-2-naphthyl | 6-sulfo-1,4-naphthylene | 3-methyl-1,4-phenylene | 4-[($\beta$-chloroethyl-sulfonyl)-methyl]-phenyl | yellow-brown (448) |
| 129 | 3,6,8-trisulfo-2-naphthyl | 6-sulfo-1,4-naphthylene | 8-sulfo-1,4-naphthylene | 4-[($\beta$-chloroethyl-sulfonyl)-methyl]-phenyl | red-brown (455) |
| 130 | 4,6,8-trisulfo-2-naphthyl | 7-sulfo-1,4-naphthylene | 3-methyl-1,4-phenylene | 3-($\beta$-chloroethyl-sulfonyl)-phenyl | yellowish brown |
| 131 | 3,6,8-trisulfo-2-naphthyl | 7-sulfo-1,4-naphthylene | 3-methyl-1,4-phenylene | 3-($\beta$-chloroethyl-sulfonyl)-phenyl | " |
| 132 | 3,6,8-trisulfo-2-naphthyl | 8-sulfo-1,4-naphthylene | 3-methyl-1,4-phenylene | 3-($\beta$-chloroethyl-sulfonyl)-phenyl | yellowish brown |
| 133 | 4,8-disulfo-2-naphthyl | 8-sulfo-1,4-naphthylene | 8-sulfo-1,4-naphthylene | 3-($\beta$-chloroethyl-sulfonyl)-phenyl | bluish brown |
| 134 | 4,8-disulfo-2-naphthyl | 8-sulfo-1,4-naphthylene | 7-sulfo-1,4-naphthylene | 3-($\beta$-chloroethyl-sulfonyl)-phenyl | reddish brown |
| 135 | 4,8-disulfo-2-naphthyl | 7-sulfo-1,4-naphthylene | 7-sulfo-1,4-naphthylene | 3-($\beta$-chloroethyl-sulfonyl)-phenyl | " |
| 136 | 4,8-disulfo-2-naphthyl | 7-sulfo-1,4-naphthylene | 8-sulfo-1,4-naphthylene | 3-($\beta$-chloroethyl-sulfonyl)-phenyl | bluish brown |

What is claimed is:

1. A compound conforming to the formula

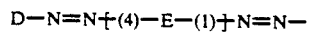

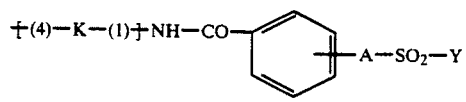

in which:

D is phenyl unsubstituted or substituted by 1, 2 or 3 substituents selected from the set of substituents: 2 sulfo, 2 alkyl having 1 to 4 carbons and 2 alkoxy having 1 to 4 carbons, at least one of these substituents being sulfo, or D is 1-naphthyl substituted by 2 to 3 sulfo, or is 2-naphthyl substituted by 2 or 3 sulfo;

E is 1,4-naphthylene unsubstituted or substituted by 1 or 2 sulfo, the azo group which is linked to D being bonded to E in the 4-position and the azo group which is linked to K being bonded to E in the 1-position;

K is 1,4-phenylene substituted by 1 or 2 substituents being selected from the set of substituents: 2 alkyl having 1 to 4 carbons, 2 alkoxy having 1 to 4 carbons, 1 alkanoylamino having 2 to 4 carbons and 1 ureido, and the azo group which is linked to E being bonded to K in the 4-position and the benzoylamido group being bonded to K in the 1-position, or K is 1,4-naphthylene, unsubstituted or substituted by 1 or 2 sulfo, the azo group which is linked to E being bonded to K in the 4-position and the benzoylamido group being bonded to K int he 1-position;

A is a direct covalent bond or is methylene, and
Y is vinyl or β-chloroethyl.

2. The compound as claimed in claim 1, wherein D is the 3,6,8-trisulfo-2-naphthyl, 4,6,8-trisulfo-2-naphthyl, 4,8-disulfo-2-naphthyl, 2,5-disulfo-phenyl, 4-methyl-2,5-disulfo-phenyl, 4-methoxy-2,5-disulfo-phenyl or 4-acetylamino-2,5-disulfo-phenyl.

3. The compound as claimed in claim 1, wherein E is 6-sulfo- or 7-sulfo-1,4-naphthylene or both.

4. The compound as claimed in claim 1, wherein K is 6-sulfo-1,4-naphthylene, 8-sulfo-1,4-naphthylene, 2-methoxy-5-methyl-1,4-phenylene, 2,5-dimethyl-1,4-phenylene, 3-methyl-1,4-phenylene, 3-acetylamino-1,4-phenylene or 3-ureido-1,4-phenylene.

5. The compound as claimed in claim 1 of the formula (1a)

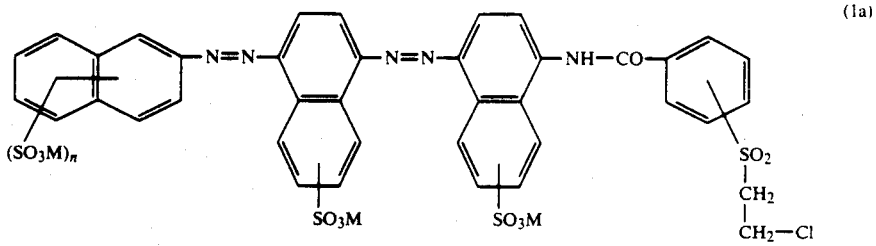

in which M is hydrogen, an alkali metal, or an alkaline earth metal, and n is the number 2 or 3.

6. The compound as claimed in claim 1 of the formula (1b)

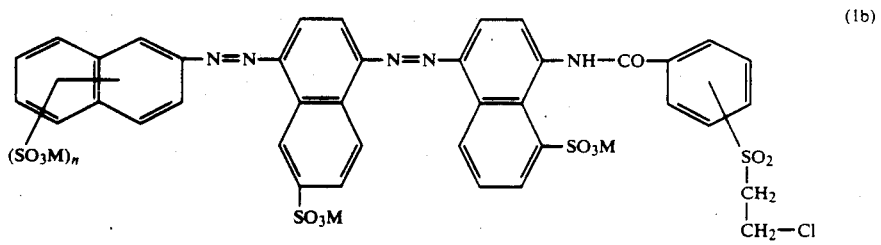

in which M is hydrogen, an alkali metal, or an alkaline earth metal, and n is the number 2 or 3.

7. The compound as claimed in claim 1 of the formula (1c)

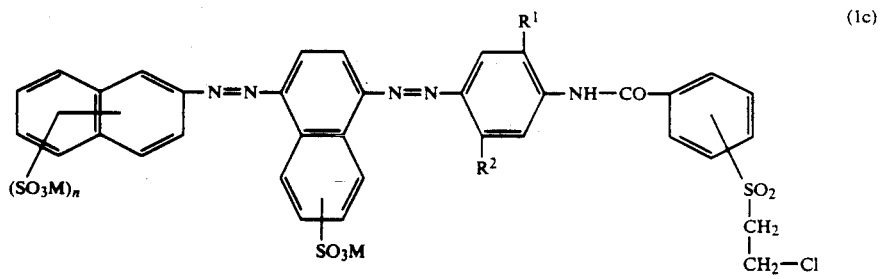

in which M is hydrogen, an alkali metal, or an alkaline earth metal, n is the number 2 or 3, $R^1$ is a hydrogen, methyl or methoxy and $R^2$ is methyl or acetylamino or ureido.

8. The compound as claimed in claim 1 of the formula (1d)

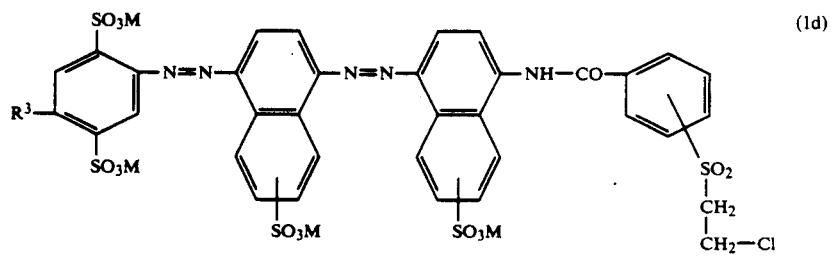

in which M is hydrogen, an alkali metal, or an alkaline earth metal, and $R^3$ is hydrogen, methyl, methoxy or acetylamino.

9. A compound according to claim 1, wherein A is a direct covalent bond.

10. A compound according to claim 5, wherein M is an alkali metal.

11. A compound according to claim 6, wherein M is an alkali metal.

12. A compound according to claim 7, wherein M is an alkali metal.

13. A compound according to claim 8, wherein M is an alkali metal.

14. A compound conforming to the formula

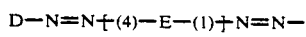

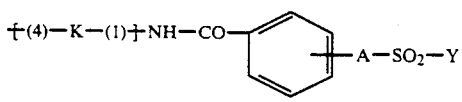

in which:

D is 3,6,8-trisulfo-2-naphthyl, 4,6,8-trisulfo-2-naphthyl, 4,8-disulfo-2-naphthyl, 2,5-disulfo-phenyl, 4-methyl-2,5-disulfo-phenyl, 4-methoxy-2,5-disulfophenyl or 4-acetylamino-2,5-disulfo-phenyl, E is 8-sulfo-1,4-naphthylene, 6-1,4-naphthylene or 7-sulfo-1,4-naphthylene, K is 8-sulfo-1,4-naphthylene, 6-sulfo-1,4-naphthylene, 7-sulfo-1,4-naphthylene, 2-methoxy-5-methyl-1,4-phenylene, 2,5-dimethyl-1,4-phenylene, 3-methyl-1,4-phenylene, 3-acetylamino-1,4-phenylene, 3-ureido-1,4-phenylene or 2-chloro-5-methyl-1,4-phenylene, A is a direct covalent bond or is methylene and Y is vinyl or β-chloroethyl.

15. The compound as claimed in claim 14, wherein E is 6-sulfo- or 7-sulfo-1,4-naphthylene.

16. The compound as claimed in claim 1, wherein K is 6-sulfo-1,4-naphthylene, 8-sulfo-1,4-naphthylene, 2-methoxy-5-methyl-1,4-phenylene, 2,5-dimethyl-1,4-phenylene, 3-methyl-1,4-phenylene, 3-acetylamino-1,4-phenylene or 3-ureido-1,4-phenylene.

* * * * *